United States Patent
Otsuki et al.

[19]

[11] Patent Number: 6,126,322

[45] Date of Patent: Oct. 3, 2000

[54] VEHICLE WHEEL SUPPORTING STRUCTURE

[75] Inventors: Hisashi Otsuki; Katsumi Furukawa, both of Iwata, Japan

[73] Assignee: NTN Corporation, Osaka-fu, Japan

[21] Appl. No.: 09/270,529

[22] Filed: Mar. 17, 1999

[30] Foreign Application Priority Data

Mar. 20, 1998 [JP] Japan .................................. 10-072611
Apr. 17, 1998 [JP] Japan .................................. 10-108007
Apr. 17, 1998 [JP] Japan .................................. 10-108009

[51] Int. Cl.[7] ............................ F16C 19/28; F16C 33/76
[52] U.S. Cl. ........................ 384/544; 384/486; 384/489; 384/568; 384/450; 277/573
[58] Field of Search ..................... 384/477, 484, 384/485, 486, 489, 544, 568, 450; 277/551, 573; 301/105.1

[56] References Cited

U.S. PATENT DOCUMENTS

| | | | |
|---|---|---|---|
| 2,896,979 | 7/1959 | Stephens | 384/489 X |
| 3,169,809 | 2/1965 | Pendleton | 384/489 X |
| 4,470,605 | 9/1984 | Deuring | 277/551 X |
| 5,135,236 | 8/1992 | Kruk | 384/486 X |

*Primary Examiner*—Richard M. Lorence
*Attorney, Agent, or Firm*—Arent Fox Kintner Plotkin & Kahn PLLC

[57] ABSTRACT

A muddy-water-proofed vehicle wheel supporting structure for mounting a wheel through a double-row tapered roller bearing on an end of an axle comprises a seal member interposed between a shoulder of the axle and a part constituting a sealing device, for example, a seal slinger, fitted to one of a pair of inner rings of the bearing that is brought into contact with the shoulder.

8 Claims, 9 Drawing Sheets

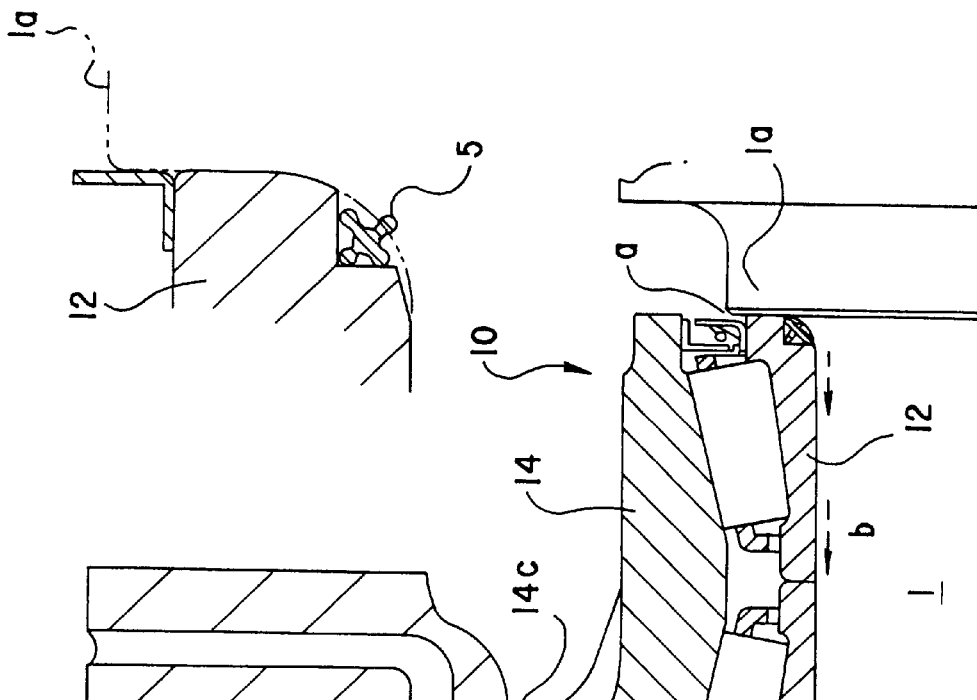
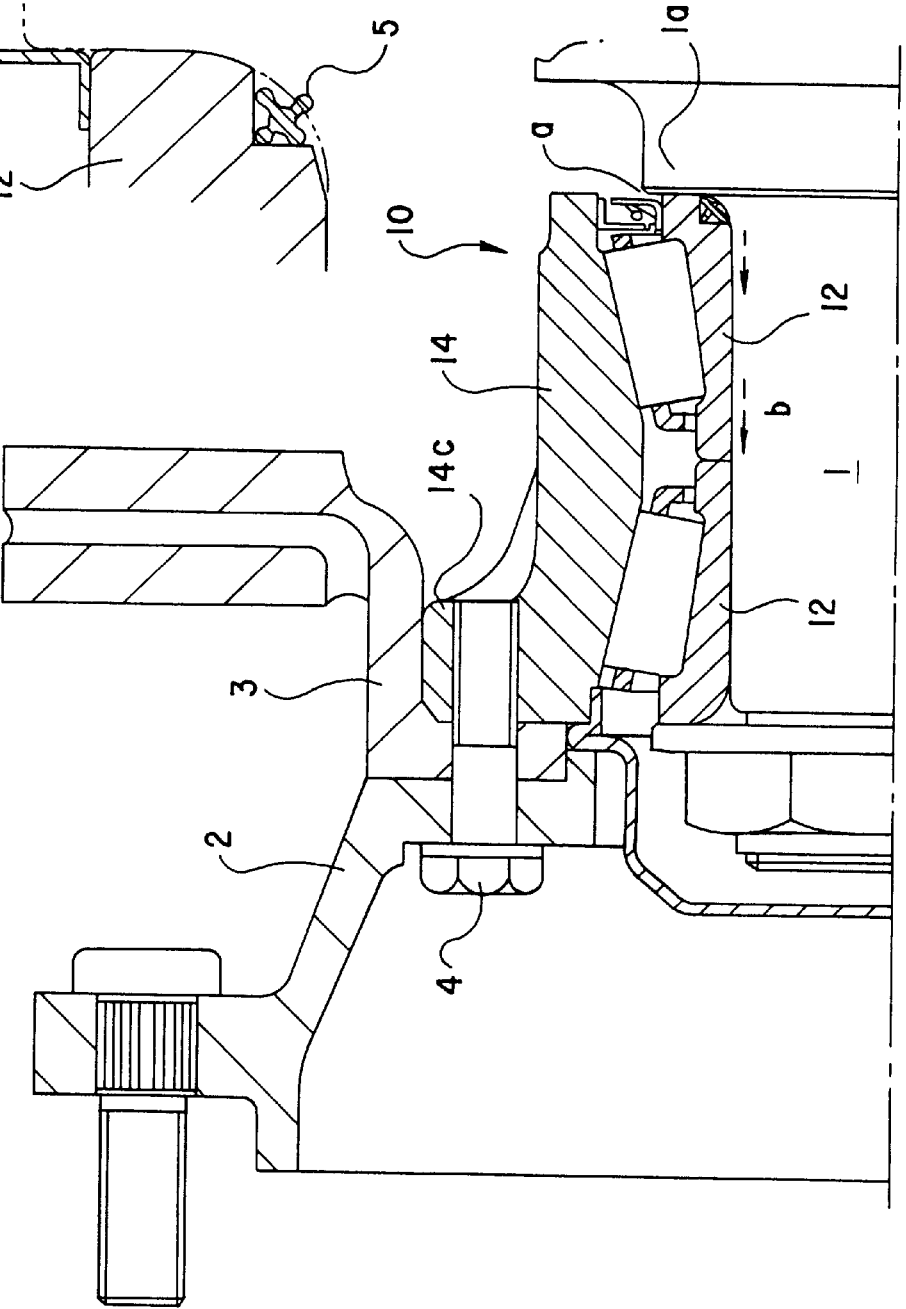
FIG.3A PRIOR ART
FIG.3B PRIOR ART

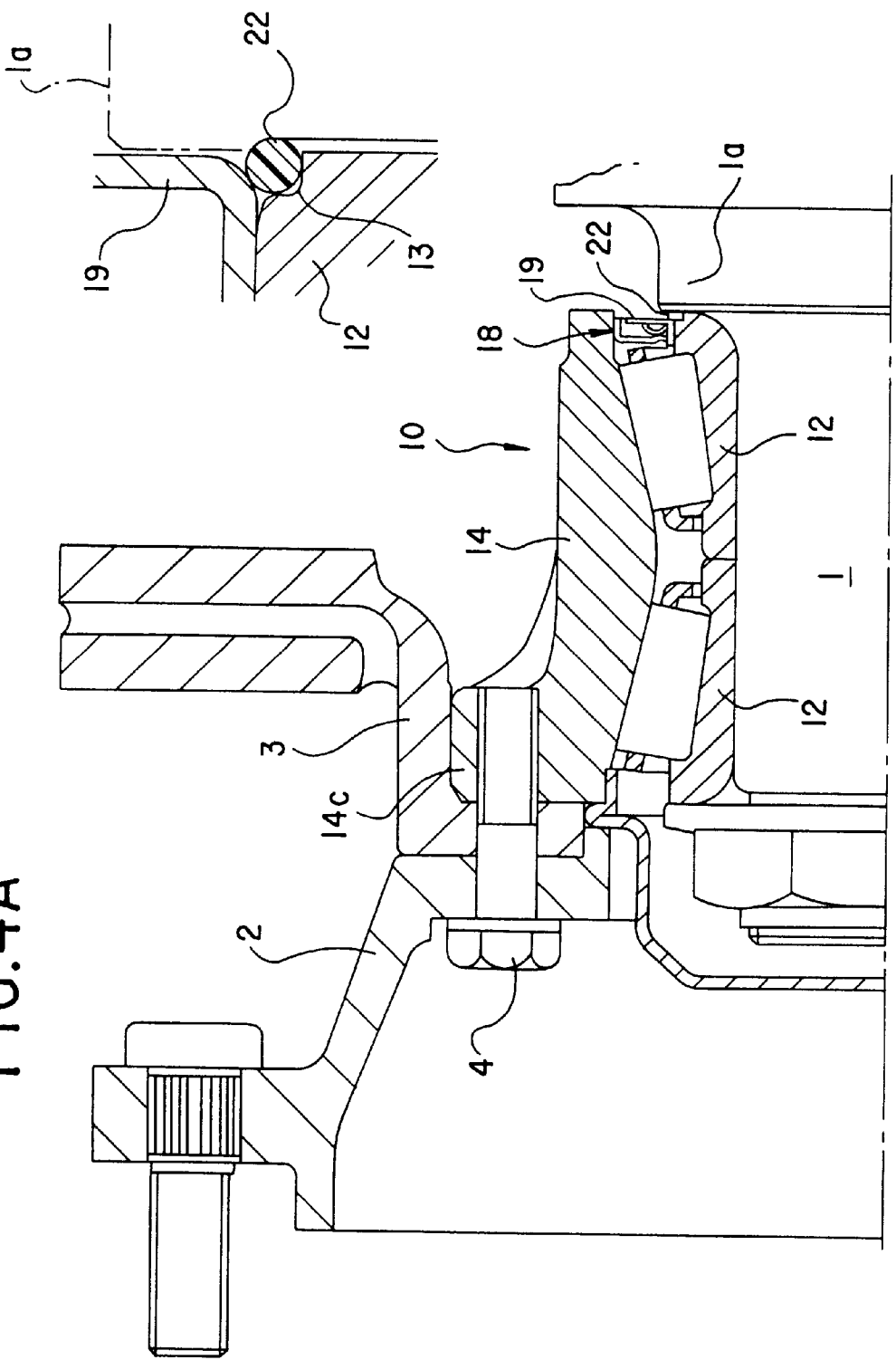

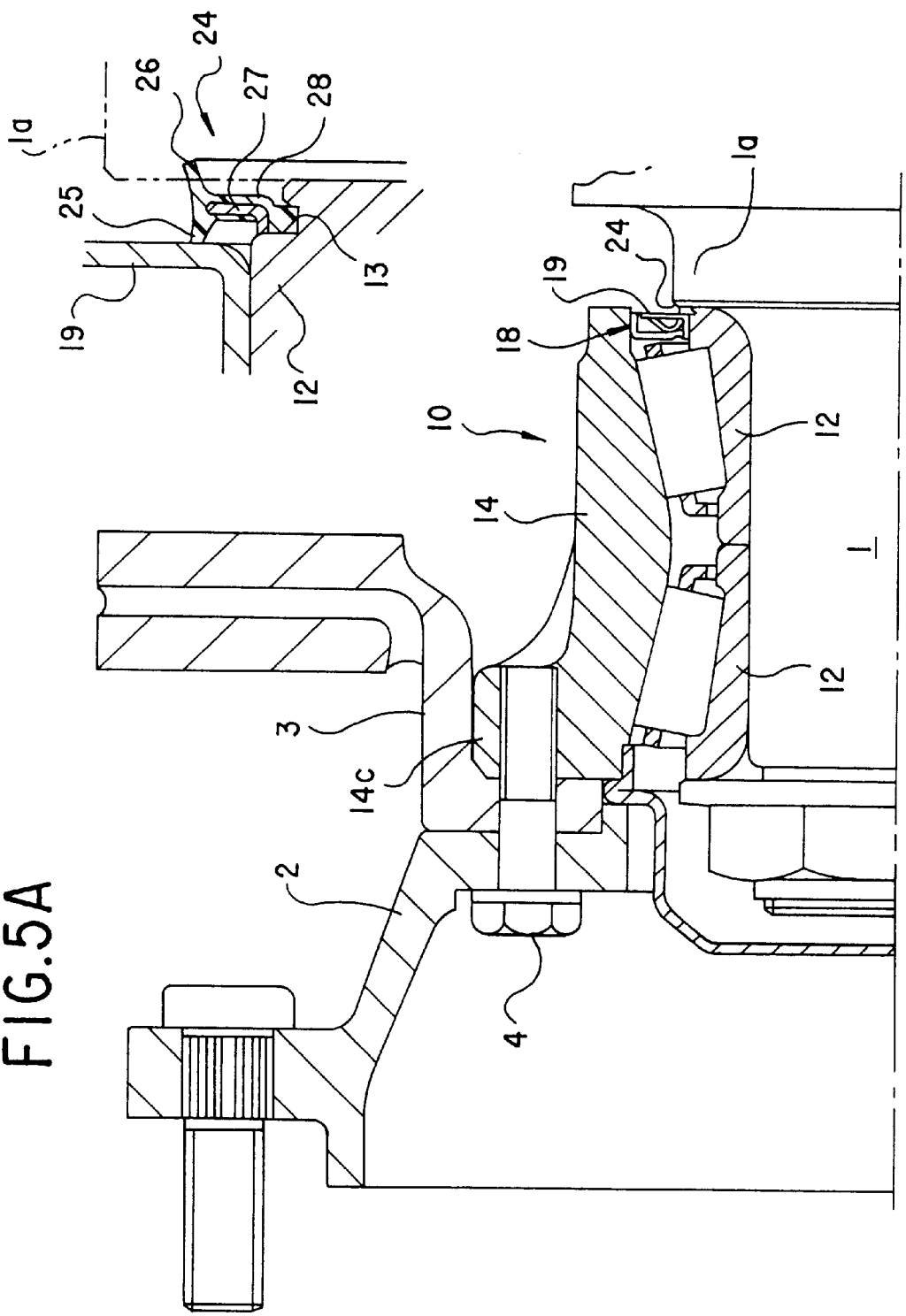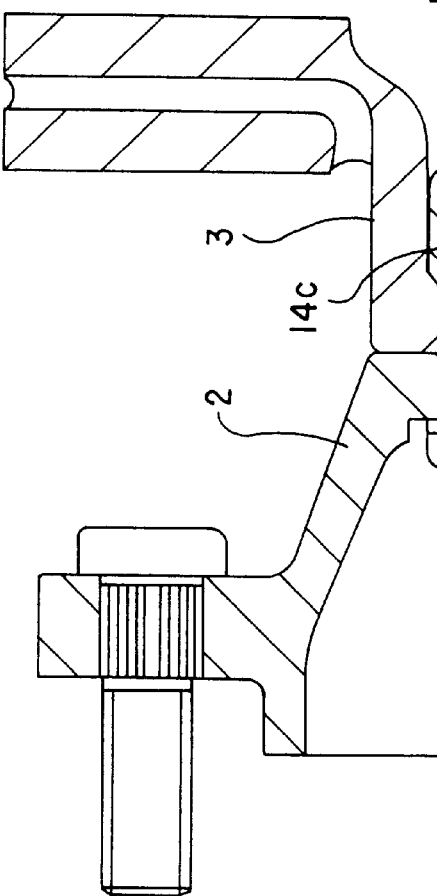

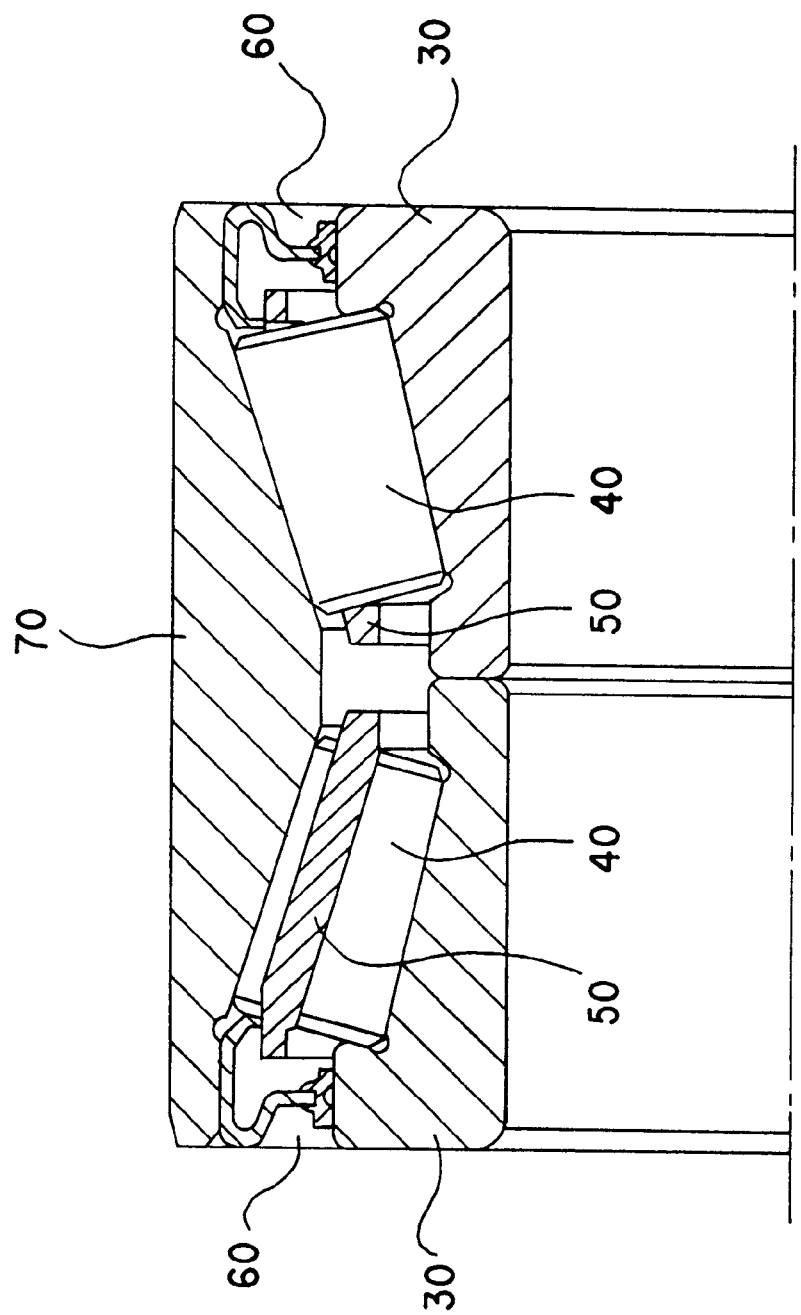

VEHICLE WHEEL SUPPORTING STRUCTURE

BACKGROUND OF THE INVENTION

1. Field of the Invention

The present invention relates to a vehicle wheel supporting structure for mounting a wheel through a double-row tapered roller bearing on an end of an axle.

2. Prior Art

The vehicle wheel supporting structure should be proof against muddy water to a degree, and accordingly, a higher sealing capability is required. In the case of a double-row tapered roller bearing, muddy water can penetrate into the bearing via two passages; i.e., along (a) mating surfaces of an inner ring and a seal slinger and (b) inner periphery of the inner ring (see FIG. 3A). Conventionally, such a sealing structure is known in which an X-ring is fitted to a chamfer of the inner ring so that muddy water may not penetrate through any clearance between the axle and the inner ring (see FIG. 3B). However, in a severe situation of use exposed to splashes of muddy water all the time, the conventional structure cannot completely prevent muddy water from penetrating through passage (a) along the mating surfaces of the inner ring and the seal slinger.

It is hence an object or the invention to provide a vehicle wheel supporting structure which is proof against muddy water.

It is another object of the invention, to prevent tapered rollers from skewing in favor of improved endurance of the double-row tapered roller bearing used in the vehicle wheel supporting structure.

The term skew of a roller means tilting of the roller with respect to its specified axis of rotation. Crowning is a slight convexity in the contour of a raceway surface and/or the generator of a roller for the main purpose of prevention of a concentrated load, or an edge load, in the contact area between a race ring and a roller, as is well known in the technical field of bearings. For example, in a tapered roller bearing for use in an axle unit of an automobile, both raceway surfaces and the rolling contact surface of a tapered roller are crowned in order to avoid any edge load on the raceway surfaces under a high moment load. In particular, in the raceway surface of an inner ring on which a high contact pressure acts, cut crownings at opposite ends are formed in addition to center crowning. Considering the distribution of contact pressure, generally, the amount of crowning of the larger diameter side cut crowning is set larger than that of the smaller diameter side cut crowning. Accordingly, the point at which the rolling contact surface of the tapered roller comes in contact with the raceway surface of the inner ring is spaced apart from the point at which the rolling contact surface of the tapered roller comes in contact with the raceway surface of the outer ring in the direction of axis of the tapered roller (see FIG. 8A). Misalignment of the contact points causes skew of tapered rollers.

SUMMARY OF THE INVENTION

In one aspect of the invention, it is contemplated to secure the sealing effect at not only passage (a) along mating surfaces of an inner ring and a seal slinger but also passage (b) along inner periphery of the inner ring with a single seal member. Thus, the vehicle wheel supporting structure according to one embodiment of the invention comprises a seal member interposed between a shoulder of an axle and a sealing means fitted to an inner ring abutting against the shoulder one and the same seal member is responsible for prevention of muddy water entering into the bearing via both passages (a) and (b), resulting in the muddy-water-proof vehicle wheel supporting structure with improved sealing effect of the double-row tapered roller bearing.

The seal member may take the form of an O-ring fitted to the inner ring. In this case, the O-ring is fitted into a seal groove of an annular step form formed in an outer circumference of the inner ring, so that the O-ring elastically abuts against both the sealing means and the shoulder of the axle. Alternatively, the seal member may take the form of a seal ring having a first annular lip elastically abutting against the sealing means, and a second annular ring elastically abutting against the shoulder of the axle. In this case, a gap for fitting the seal ring is provided between the sealing means and the shoulder of the axle.

The seal ring may be composed of first and second annular lips and a disk-shaped seal body, the first and second annular lips being integrally formed on the outer circumference of the seal body. An inner circumference of the seal body is fitted to a seal groove in an annular step form formed in the outer circumference of the inner ring.

In another aspect of the invention, it is contemplated to prevent the tapered rollers from skewing by moving the peak of crowning on the raceway surface of the outer ring to the smaller diameter side, so as to align the points of contact of the raceway surfaces of the inner and outer rings and the rolling contact surface of the tapered roller, as viewed in the axial direction of the tapered roller. Thus, in the vehicle wheel supporting structure according to another embodiment of the invention, the raceway surface of each of the inner rings includes a crowning at the center thereof and asymmetric cut crownings at opposite ends thereof, the outer ring having a full crowning formed on each raceway surface thereof, the tapered roller having a full crowning formed on a rolling contact surface thereof, and wherein a point at which the rolling contact surface of the tapered roller comes in contact with the raceway surface of each of the inner rings and a point at which the rolling contact surface of the tapered roller comes in contact with each of the raceway surfaces of the outer ring are aligned in the axial direction of the tapered roller. This means alignment of the points of action of the forces the tapered roller receives from the inner and outer rings when the bearing rotates, which in turn results in that the distances (radii) from the axis of the tapered roller to the contact point where the tapered roller comes in contact with the outer ring and to the contact point where the tapered roller comes in contact with the inner ring are equal to each other. Accordingly, no moment is produced that would turn the axis of the tapered roller, so that skew of the roller can hardly occur.

The asymmetric cut crowning means that the width and/or amount of crowning of the smaller diameter side cut crowning differ from that of the larger diameter side cut crowning. Although they are to be determined depending on the application and design specification of the double-row tapered roller bearing, the amount of crowning of the larger diameter side cut crowning of the inner ring is generally set larger than that of the smaller diameter side cut crowning.

Since asymmetric cut crownings are disposed at opposite ends of the raceway surface of the inner ring, the center line or the generator of the center crowning does not coexist with the center line of the generator of the entire raceway surface. The point of contact of the rolling contact surface of the tapered roller and the raceway surface of the inner ring is preferably positioned on the center line of the generator of the center crowning in order to distribute the load over the entire length of the center crowning.

Embodiments of the invention will be described in detail in conjunction with the accompanying drawings.

BRIEF DESCRIPTION OF THE DRAWINGS

FIG. 3A is a longitudinal sectional view similar to FIG. 1, showing the conventional vehicle wheel supporting structure;

FIG. 3B is an enlarged view of an X-ring part of FIG. 3A;

FIG. 4A is a longitudinal sectional view similar to FIG. 1, showing the vehicle wheel supporting structure according to one embodiment of the invention;

FIG. 4B is an enlarged view of a seal member part of FIG. 4A as at S in FIG. 2;

FIG. 5A is a longitudinal sectional view similar to FIG. 4A, showing a modification of the seal member;

FIG. 5B is an enlarged view of a seal member part of FIG. 5A as at S in FIG. 2;

FIG. 7 is a cross sectional view of a double-row tapered roller bearing according to another embodiment of the invention;

DETAILED DESCRIPTION OF THE PREFERRED EMBODIMENTS

Figure 1:
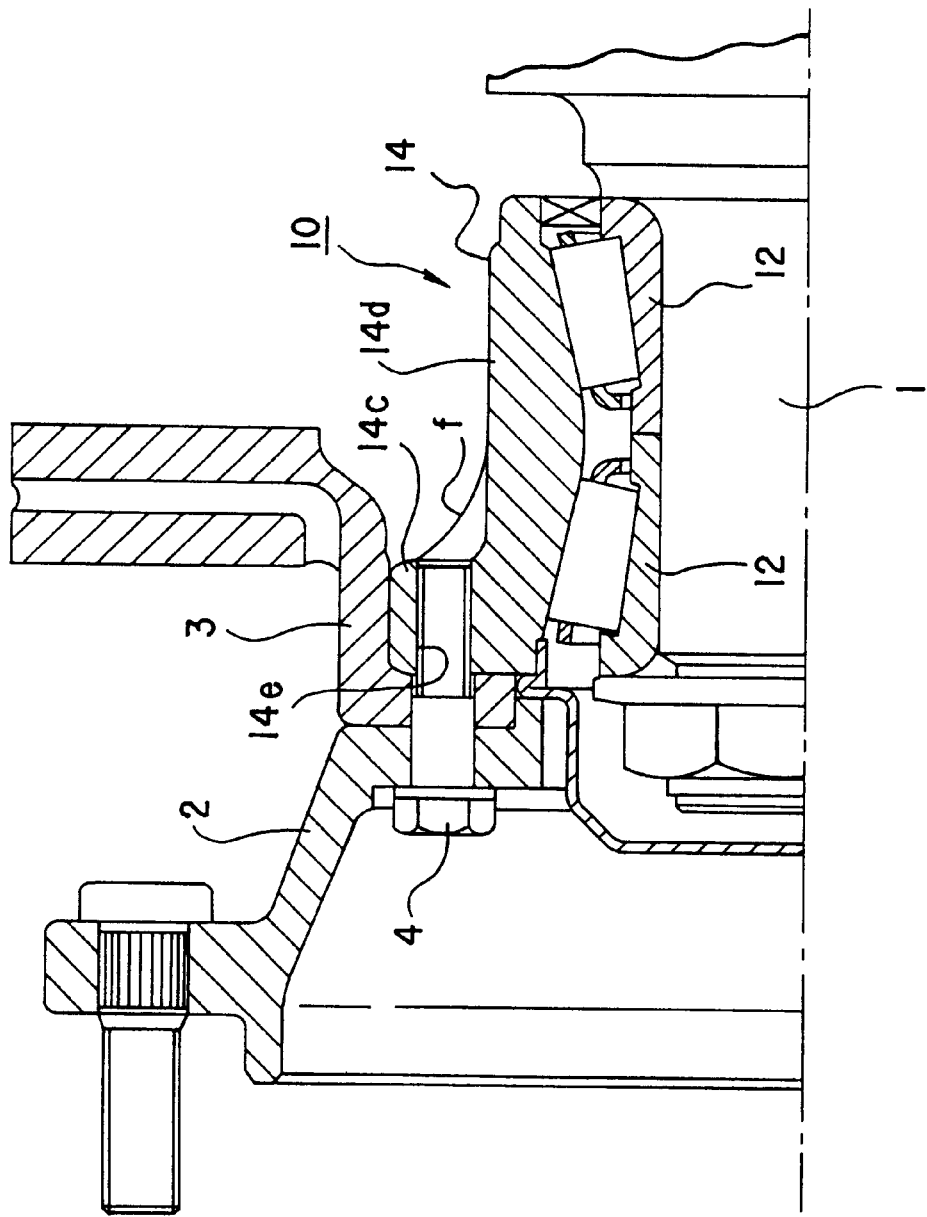
FIG. 1 is a longitudinal sectional view of a vehicle wheel supporting structure.

Referring first to FIG. 1 which shows a wheel supporting structure for mounting a driven wheel (not shown) of a truck through a double-row tapered roller bearing 10 on an end of an axle 1, a pair of inner rings 12 of the bearing 10 are fitted on the axle 1. A wheel disc 2, to which the wheel is attached, and a brake disc 3 are fixed to a hub flange 14c of a support 14 corresponding to an outer ring of the bearing. Generally, the wheel disc 2, the brake disc 3 and the support 14 are fastened together with an even number, e.g. 6 to 12, of bolts 4, and threaded holes 14e are formed in the flange 14c of the support 14 for that purpose.

Figure 2:
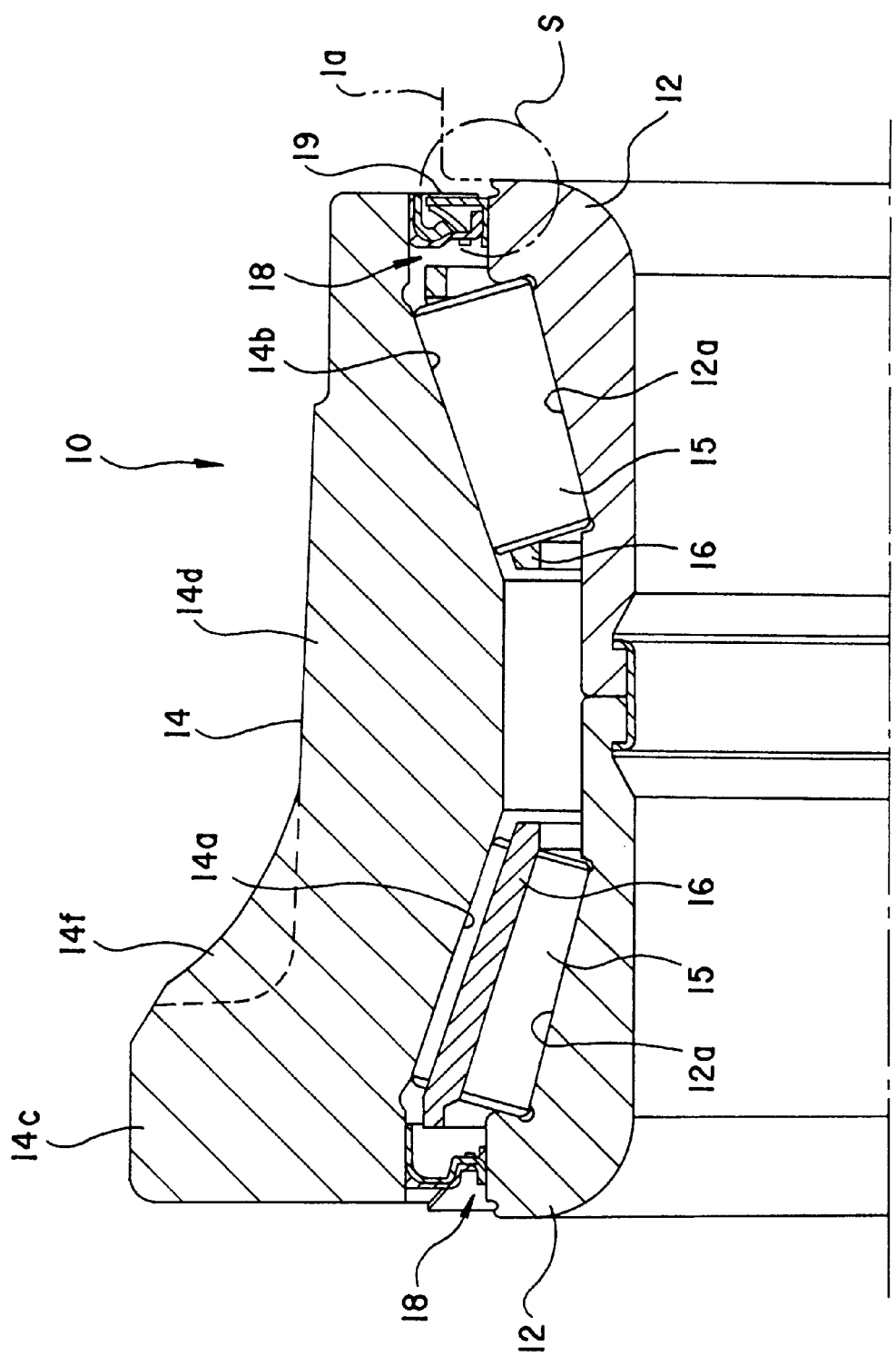
FIG. 2 is a longitudinal sectional view of the double-row tapered roller bearing shown in FIG. 1.

FIG. 2 shows in detail the double-row tapered roller bearing 10, which is composed of a pair of inner rings 12 each having a raceway surface 12a in its outer circumference, an outer ring 14 having double rows of raceway surfaces 14a and 14b formed in its inner circumference, double rows of tapered rollers 15 located between the raceway surfaces 12a of the inner rings 12 and the raceway surfaces 14a and 14b of the outer ring 14, cages 16 for keeping the rollers 15 of each row correctly spaced along the periphery of the bearing, and seals 18 attached to both end openings of the bearing for preventing foreign matters getting in. The portion indicated with a circle S in FIG. 2 will be described later in relating to FIG. 4B and FIG. 5B.

Conventionally, an X-ring 5 is fitted to a chamfer of the inner ring 12 as shown in FIG. 3B to prevent muddy water from penetrate through any clearance between the axle 1 and the inner ring 12. However, in the double-row tapered roller bearing 10, as shown in FIG. 3A, muddy water can penetrate into the bearing via two passages; i.e., along (a) mating surfaces of the inner ring 12 and a seal slinger and (b) inner periphery of the inner ring 12.

FIG. 4A and FIG. 4B show an embodiment of the invention in which the seal member in the form of an O-ring 22 is interposed between a shoulder 1a of the axle 1 and a seal slinger 19 which is a part of sealing means, that is, a seal 18 fitted to the inner ring 12 abutting against the shoulder 1a so as to maintain the sealing capability at both passages (a) and (b) (see FIG. 3). In this case, the O-ring 22 is fitted into a seal groove 13 in an annular step form formed in the outer circumference of the inner ring 12 so as to elastically abut against both the seal slinger 19 and the axle shoulder 1a.

FIG. 5A and FIG. 5B show a modification in which the seal member takes the form of a seal ring 24. The seal ring 24 has a substantially cylindrical portion composed of rubber or other elastic material, which provides at its one end a first annular lip 25 and at the other end a second annular lip 26. The seal ring 24 is inserted between the seal slinger 19 and the axle shoulder 1a, the first annular lip 25 elastically abutting against the seal slinger 19 while the second annular lip 26 elastically abutting against the spindle shoulder 1a, so that the sealing capability at both position (a) and position (b) is enhanced. In the drawing, the first and second annular lips 25 and 26 are shown in an initial state before elastic deformation. In the seal ring 24, the first and second annular lips 25 and 26 are formed integrally on an radially outward edge of a disk-shaped seal body 28. The seal body 28 is integrally molded with a metal core 27, and its radially inward edge is fitted to a seal groove 13 in an annular step form formed in an outer circumference of the inner ring. As a result, the seal ring 24 is securely held in position to bring the first and second annular lips 25 and 26 is maintained, into proper contact, thus ensuring that the desired sealing action lasts for a long period.

Referring again to FIG. 1, the flange 14c usually has a large corner R (f) in the transfer portion to the outer circumference of the support 14 in order to withstand the moment load caused by the wheel. The impact, transmitted from the wheel to the bearing 10 while the vehicle is running includes a strong moment load aside from the force component in the radial direction, and the entire load caused by the impact is transmitted through one or several bolts to the flange 14c as the tensile force in the axial direction. Therefore, a stronger bending stress acts on the flange 14c in the region of the threaded holes 14e than in the sleeve part 14d, the bending stress always varying with rotation of the wheel. As a result, an extreme stress is put in the transfer region between the flange 14c and the sleeve 14d.

Figure 6A:
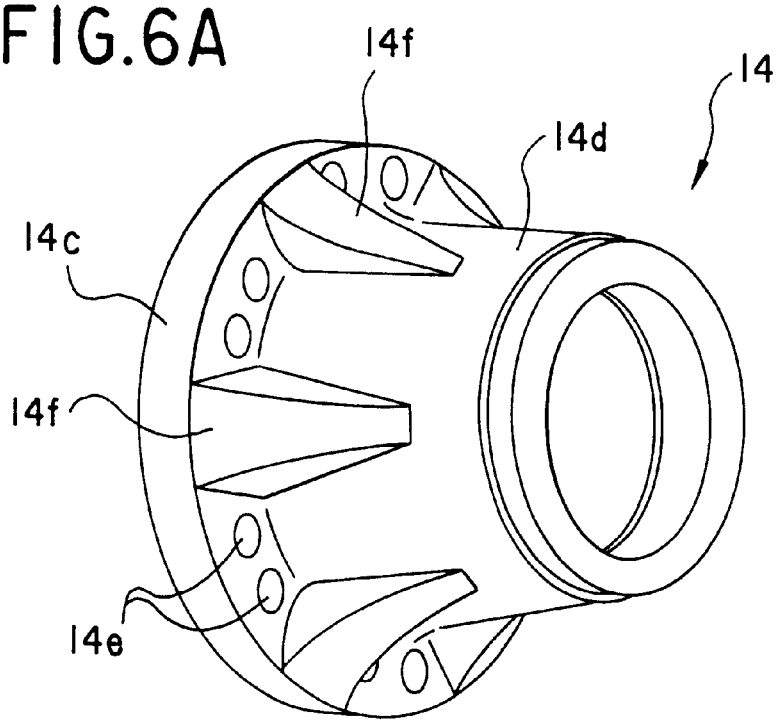
FIG. 6A is a perspective view of a support or an outer ring of the double-row tapered roller bearing.

As shown in FIG. 6A, the support 14 includes a sleeve part 14d in a substantially cylindrical shape, a radially outwardly extending flange 14c at one end of the sleeve 14d, and a plurality of axially extending ribs 14f disposed on the outer circumference of the sleeve. The support 14 corresponds to the double-row outer ring having double rows of raceways 14a and 14b for rolling tapered rollers. As shown in FIG. 2, double rows of raceway surfaces 14a and 14b are formed integrally in the inner circumference of the support. Alternatively, a separate race ring may be fitted into the support. The flange 14c has threaded holes 14e disposed at specified intervals in the circumferential direction. Screwing the mounting bolts 4 tight in the threaded holes 14e fastens the wheel disc 2 and the brake disc 3 to the flange 14c. The thickness T of the flange 14c is so designed as to provide the strength necessary for the fastening.

Figure 6B:
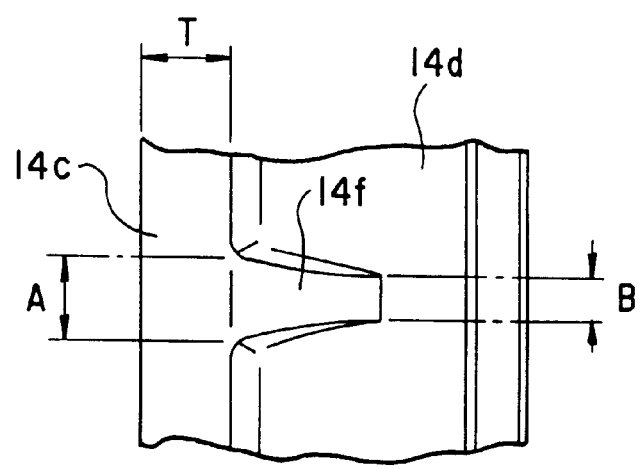
FIG. 6B is a partial plan view of the support shown in FIG. 6A.

In the case of the illustrated support 14, the ribs 14f are positioned every two holes 14e and axially extend along the sleeve 14d to reinforce the flange 14c. The adjacent ribs 14f are independent from each other, each rib 14f having the following configuration: The rib 14f has a slight taper as viewed in FIG. 6B, i.e., it tapers from the width A at one end where it joins up with the flange 14c side to the width B at the other end where it joins up with the outer circumference of the sleeve 14d. The longitudinal sectional shape of the rib 14f is substantially a right triangle, having the bottom axially extending and joining up with the outer circumference of the sleeve 14d, the height radially extending and joining up with one wall of the flange 14c, and the concave hypotenuse. In other words, the distance in the radial direction from the outer circumference of the sleeve 14d to the hypotenuse gradually decreases as departing from the flange. The cross-sectional shape of the rib 14f is substantially a trapezoid. Therefore, the cross-sectional area of the rib 14f is largest at one axial end adjacent to the flange 14c, and gradually decreases as departing from the flange.

As has been described, the vehicle wheel supporting structure shown in FIGS. 1, 2, 6A and 6B is advantageous in that it allows the excess material to be removed from between adjacent ribs to thereby cut down the weight by about 10% as compared with the conventional ones. Still more, the particular rib structure provides sufficient flange strength and rigidity. Hence, when applied in the hub bearing for supporting a wheel of a vehicle, it satisfactorily withstands the moment of a force caused by the wheel and yet meets the requirement of reduction of weight of vehicle.

Figure 9A:
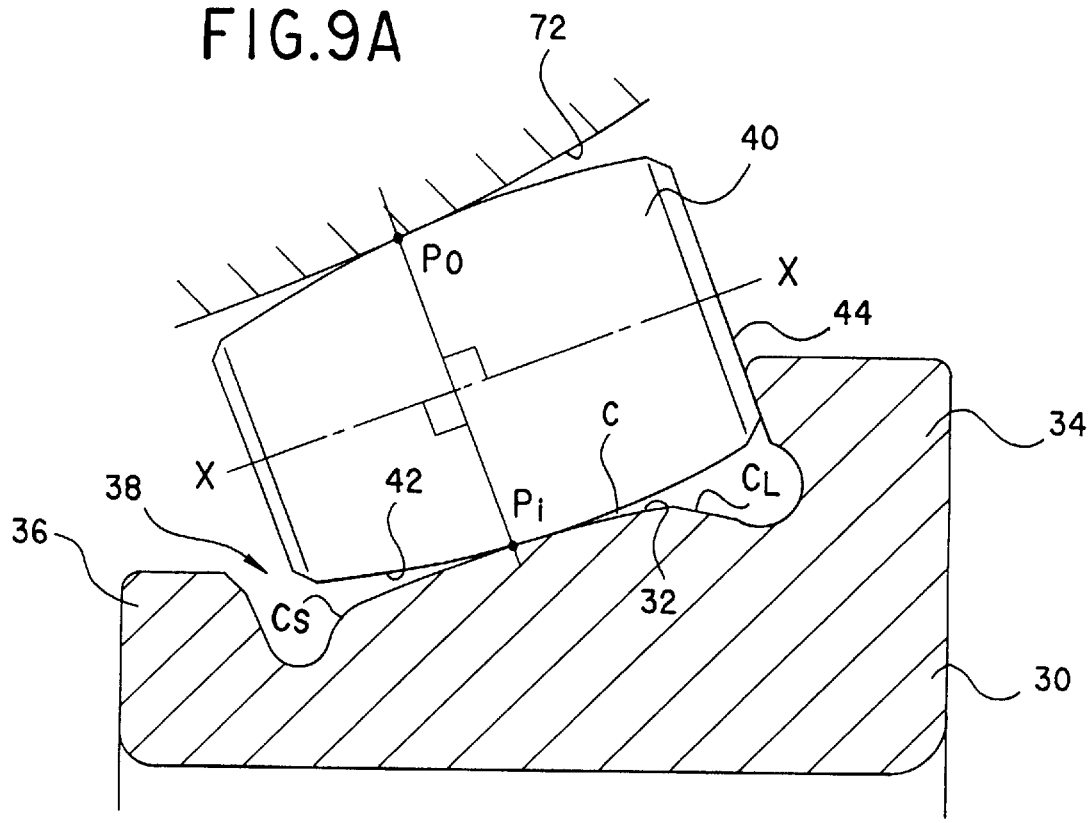
FIG. 9A is an enlarged view similar to FIG. 8A, showing the conventional tapered roller bearing.

Referring now to FIG. 7 and FIG. 9A, the double-row tapered roller bearing 10 is composed of a pair of inner rings 30 having raceway surfaces 32, respectively, a double-row outer ring 70 having double rows of raceway surfaces 72, double rows of tapered rollers 40 rotatably located between the raceway surfaces 32 and 72 of the inner and outer rings 30 and 70, cages 50 for keeping the tapered rollers 40 of each row correctly spaced along the periphery of the bearing, and seals 60 for preventing liquid or other substances from getting in.

Figure 8A:
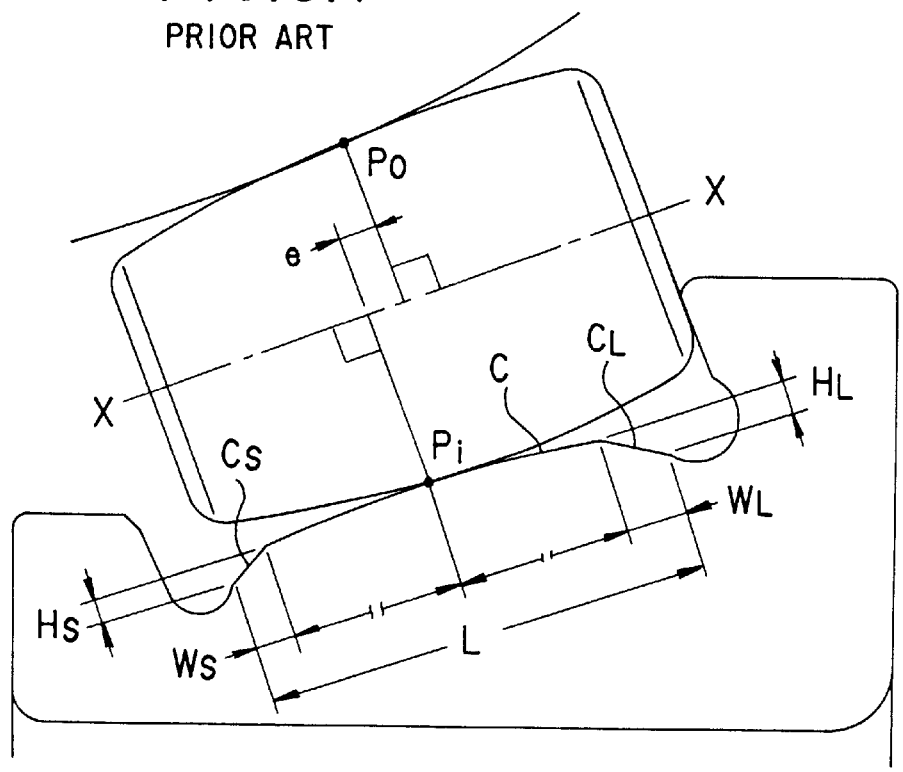
FIG. 8A is an enlarged view in part of FIG. 7.

As shown in FIG. 8A, in particular, on the raceway surface of an inner ring on which a high contact pressure acts, cut crownings CL and CS are formed at opposite ends in addition to center crowning C, the length of generator of the raceway surface being represented by L. In FIG. 8A, in the larger diameter Bide cut crowning CL, the width and the amount of crowning are represented by WL and HL, respectively, while in the smaller diameter side cut crowning CS, the width and the amount of crowning are represented by WS and HS, respectively. Considering the distribution of contact pressure, generally, the amount of crowning of the larger diameter side cut crowning CL is set larger than that of the smaller diameter side cut crowning CS (HL>HS). Accordingly, the point Pi at which the rolling contact surface of the tapered roller comes in contact with the raceway surface of the inner ring is spaced apart from the point Po at which the rolling contact surface of the tapered roller comes in contact with the raceway surface of the outer ring as by e in the direction of axis X—X of the tapered roller. In other words, the contact point Po is positioned on the center line of the rolling contact surface of the tapered roller, whereas the contact point Pi is positioned away from the center line toward the smaller diameter side of the tapered roller. Meanwhile, the contact point Pi is positioned on the center line of the crowning C in the center on the raceway surface of the inner ring, and in this sense the crowning C is symmetrical. By contrast, the cut crownings CL and CS at opposite ends are asymmetrical.

Figure 9B:
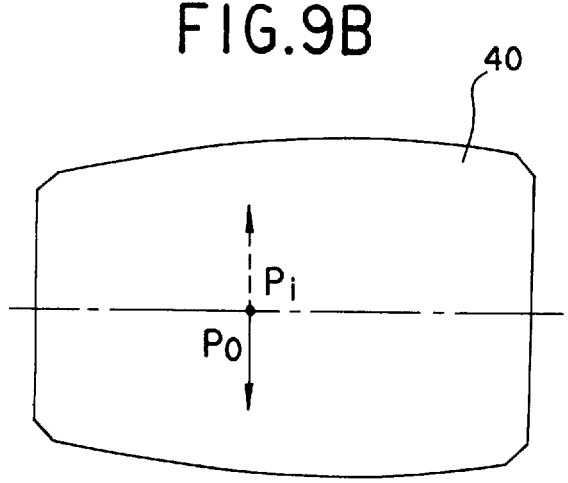
FIG. 9B is a schematic plan view of the tapered roller shown in FIG. 9A.

In view of the fact that nonalignment of the contact points Pi and Po can cause skew of the tapered roller, the double-row tapered roller bearing taking the problem into account will now be described with reference to FIG. 9A and FIG. 9B.

As shown in FIG. 9A, symmetric crownings are formed on the rolling contact surface 42 of the tapered roller 40, and a large end face 44 comes in contact with a cone back face rib 34 of the inner ring 30. FIG. 9A shows in an enlarged scale a part of FIG. 7, and the crownings are somewhat exaggerated for the sake of clarity. The dimensions of crowning of the raceway surface 32 of the inner ring 30 are the same as in FIG. 8A, and hence reference numerals and characters are omitted.

The inner ring 30 has the cone back face rib 34 and a retaining rib 36 at opposite ends thereof, and a raceway groove 38 formed between the ribs 34 and 36. The raceway surface 32 at the bottom of the raceway groove 38 is composed of a center crowning C situated in the center of the length of generator of the raceway surface and cut crownings CL and CS at opposite ends. As previously described in relation to FIG. 7, in the larger diameter side cut crowning CL, the width and the amount of crowning are represented by WL and HL, respectively, while in the smaller diameter side cut crowning CS, they are represented by WS and HS, respectively. As will be seen from FIG. 8A and FIG. 9A, the larger diameter side cut crowning CL is larger in both width and crowning amount than the smaller diameter side cut crowning CS (WL>WS, HL>HS). Point Pi where the raceway surface 32 and the tapered roller 40 come in contact with each other is positioned on the center line of the length of the generator of the center crowning C.

Figure 8B:
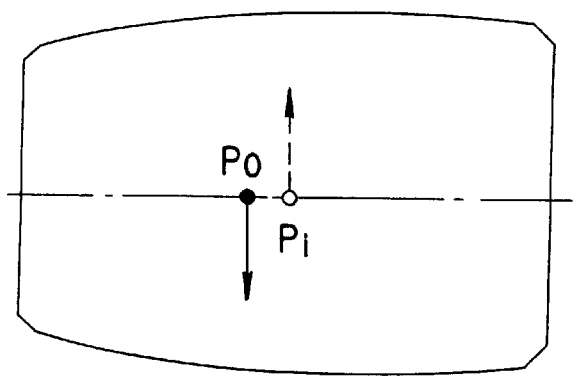
FIG. 8B is a schematic plan view of the tapered roller shown in FIG. 8A.
Figure 8C:
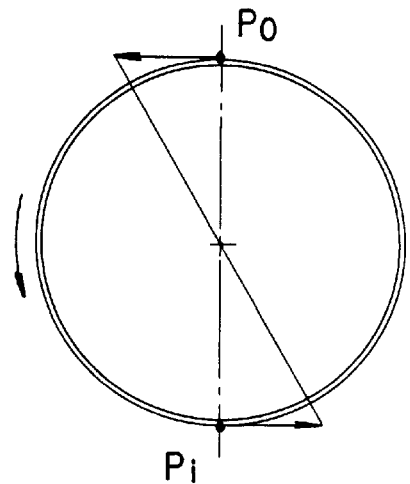
FIG. 8C is a schematic cross sectional view of the tapered roller shown in FIG. 8A.
Figure 9C:
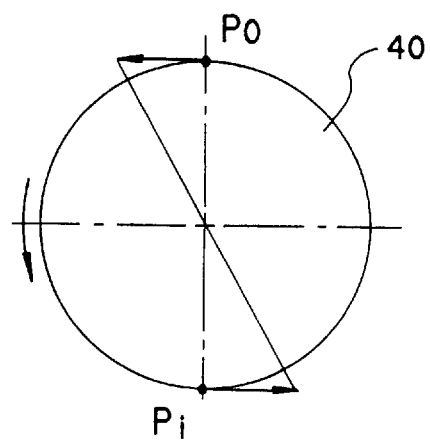
FIG. 9C is a schematic cross sectional view of the tapered roller shown in FIG. 9A.

Also the raceway surface 72 of the outer ring 70 has a crowning, and the peak of crowning, that is, the point at which it comes in contact with the tapered roller 40 is represented by Po. This contact point Po passes through the contact point Pi, and is positioned on a straight line vertical to the axis X—X or the tapered roller. In other words, as compared with the FIG. 8 arrangement, the contact point Po is moved to the smaller diameter side along the axis X—X of the tapered roller 40 so that the both contact points Pi and Po are aligned, which results in alignment of the points of application of the forces the tapered roller 40 receives from the inner and outer ring 30 and 70 during rotation of the bearing, as shown in FIG. 9B. The distances (radii) from the axis X—X of the tapered roller 40 to the contact points Pi and Po are equal to each other (see FIG. 9C). Therefore, no moment is produced that would turn the axis of the tapered roller 40 (axis of rotation) and the axis of the tapered roller 40 remains unchanged, thus allowing the tapered roller to roll without any skew being caused.

The entire disclosure including specification, claims, drawings and abstract of Japanese Patent Applications No. 10-72611, filed on Mar. 20, 1998, No. 10-108007, filed on Apr. 17, 1998 and No. 10-108009, filed on Apr. 17, 1998 are incorporated herein by reference in their entirety.

What is claimed is:

1. A vehicle wheel supporting structure for mounting a wheel through a double-row tapered roller bearing on an end of an axle, comprising a seal member interposed between a shoulder of the axle and a sealing means fitted to an inner ring of the bearing abutting against the shoulder.

2. A vehicle wheel supporting structure comprising:

an axle;

a double-row tapered roller bearing, the bearing including a pair of inner rings mounted on said axle, each of the inner rings having a raceway surface formed in an outer periphery thereof, one of the inner rings abutting against a shoulder of the axle, an outer ring having a hub flange for connection with a wheel disc, the outer ring having double rows of raceway surfaces formed in an inner periphery thereof, double rows of tapered rollers located between the raceway surfaces of the inner and outer rings, cages for keeping the rollers correctly spaced along the periphery of the bearing, and seal means fitted to opposite end openings of the bearing for preventing foreign matters getting in; and a seal member interposed between the shoulder of the axle and the sealing means fitted to said one of the inner rings abutting against the shoulder.

3. A vehicle wheel supporting structure of claim 2, wherein said seal member is in the form of an O-ring fitted into a seal groove of an annular step form formed in an outer circumference of said one of the inner rings, the O-ring elastically abutting against both the shoulder and the sealing means.

4. A vehicle wheel supporting structure of claim 2, wherein said seal member is in the form of a seal ring having a first annular lip elastically abutting against the sealing means and a second annular ring elastically abutting against the shoulder.

5. A vehicle wheel supporting structure of claim 4, wherein said seal ring is composed of first and second annular lips and a disk-shaped seal body, the first and second annular lips being integrally formed on the outer circumference of the seal body, while an inner circumference of the seal body being fitted to a seal groove in an annular step form formed in an outer circumference of said one of the inner rings.

6. A vehicle wheel supporting structure of claim 2, wherein the raceway surface of each of the inner rings includes a crowning at the center thereof and asymmetric cut crownings at opposite ends thereof, the outer ring having a full crowning formed on each raceway surface thereof, the tapered roller having a full crowning formed on a rolling contact surface thereof, and wherein a point at which the rolling contact surface of the tapered roller comes in contact with the raceway surface of each of the inner rings and a point at which the rolling contact surface of the tapered roller comes in contact with each of the raceway surfaces of the outer ring are aligned in the axial direction of the tapered roller.

7. A vehicle wheel supporting structure of claim 6, wherein the amount of crowning of the cut crowning on the larger diameter side of the inner ring is larger than the amount of crowning of the cut crowning on the smaller diameter side of the inner ring.

8. A vehicle wheel supporting structure of claim 6, wherein the point of contact of the rolling contact surface of the tapered roller and each of the raceway surfaces of the outer ring is disposed at the center of the length of generator of the crowning at the center of the raceway surface of each of the inner rings.

* * * * *